(12) United States Patent
Louwagie et al.

(10) Patent No.: US 7,721,764 B2
(45) Date of Patent: May 25, 2010

(54) PROCESS PRESSURE MEASUREMENT SYSTEM WITH IMPROVED VENTING

(75) Inventors: Bennett L. Louwagie, Eden Prairie, MN (US); David A. Broden, Andover, MN (US)

(73) Assignee: Rosemount Inc., Eden Prairie, MN (US)

( * ) Notice: Subject to any disclaimer, the term of this patent is extended or adjusted under 35 U.S.C. 154(b) by 713 days.

(21) Appl. No.: 11/580,512

(22) Filed: Oct. 13, 2006

(65) Prior Publication Data

US 2008/0087335 A1  Apr. 17, 2008

(51) Int. Cl.
*F17D 1/00* (2006.01)
(52) U.S. Cl. ........................... 137/884; 137/597
(58) Field of Classification Search ........... 137/884, 137/597; 251/318
See application file for complete search history.

(56) References Cited

U.S. PATENT DOCUMENTS

| | | | |
|---|---|---|---|
| 3,526,136 A | 9/1970 | Caldwell et al. | |
| 4,164,241 A | 8/1979 | Kubo | 137/377 |
| 4,466,290 A | 8/1984 | Frick | 73/756 |
| 4,711,268 A * | 12/1987 | Coleman | 137/597 |
| 5,036,884 A | 8/1991 | Miller et al. | 137/597 |
| 5,277,224 A | 1/1994 | Hutton et al. | 137/597 |
| 5,709,247 A | 1/1998 | Hutton | 137/884 |
| 5,725,024 A * | 3/1998 | Nimberger | 137/597 |
| 6,035,724 A | 3/2000 | Hewson | 73/756 |
| 6,675,658 B2 * | 1/2004 | Petrich et al. | 73/756 |

OTHER PUBLICATIONS

An Official Search Report of the European Patent Office in counterpart foreign application No. PCT/US2007/020447 filed Sep. 21, 2007.
LD301 Series Smart Pressure Transmitters, Smar International, 2003.
LD302 Series Fieldbus Pressure Transmitters, Smar International. Image of LD302 product.

* cited by examiner

*Primary Examiner*—Kevin L Lee
(74) *Attorney, Agent, or Firm*—Christopher R. Christenson; Westman, Champlin & Kelly, P.A.

(57) ABSTRACT

A process fluid pressure measurement system includes a process fluid pressure transmitter coupled to a coplanar manifold. The coplanar manifold includes a first bore coupleable to a source of process fluid, and a vent passageway connected to the first bore and terminating in a vent hole. The coplanar manifold includes at least one port configured to receive a valve stem. Directly engaging the valve stem with the coplanar manifold selectively vents the coplanar manifold. Aspects of the present invention also include a coplanar manifold for coupling fluid to a process fluid pressure transmitter, and a method of venting such a coplanar manifold.

6 Claims, 5 Drawing Sheets

PROCESS PRESSURE MEASUREMENT SYSTEM WITH IMPROVED VENTING

BACKGROUND OF THE INVENTION

The term "process variable" generally refers to a physical or chemical state of matter or conversion of energy. Examples of process variables include pressure, temperature, flow, conductivity, pH, and other properties. The term "process measurement" refers to the acquisition of information that establishes the magnitude of process quantities. Pressure is considered a basic process variable in that it is used for the measurement of flow (the difference of two pressures), level (head or back pressure), and even temperature (fluid pressure in a thermal system).

An industrial process transmitter generally includes a transducer or sensor that responds to a measured variable with a sensing element that converts the variable to a standardized transmission signal, e.g., an electrical or optical signal where air pressure, that is a function of the measured value. Industrial process pressure transmitters are used to measure pressure within industrial processes such as slurries, liquids, vapors and gasses in chemical, pulp, petroleum, gas, pharmaceutical, food, and other fluid processing plants. Industrial process fluid transmitters are often placed near the process fluids, or in field applications. Often, these field applications are subject to harsh and varying environmental conditions that provide challenges for designers of such transmitters.

Process fluid pressure transmitters are generally coupled to the process by virtue of a manifold. The manifold routes the process fluid from one or more process fluid inlets to one or more process fluid outputs, which process fluid outputs are arranged, or otherwise configured in a standardized manner to match, or otherwise cooperate with, the location of process fluid inputs on pressure sensor modules of process pressure transmitters.

One particular type of manifold is known as a coplanar style manifold. Such manifolds are available from Rosemount, Inc. of Eden Prairie, Minn. under the trade designation Model 305 and Model 306 manifolds. Each of the models 305 and 306 manifolds can be ordered in a variety of configurations. Generally, a manifold will have at least one valve that provides pressure transmitter isolation. This isolation can allow the process pressure transmitter to be removed and repaired and/or replaced while the valve maintains isolation from the process. Coplanar manifolds can also be provided with two, three and five valve configurations. All such coplanar manifolds generally provide a plug for drain/vent capabilities. Coplanar manifolds can allow a number of process fluid pressures to be coupled to a process fluid pressure transmitter through a single, unitary manifold. Such a configuration can reduce installation costs and technician time, as well as provide an extremely robust process fluid connection.

Any interface between two surfaces which contacts process fluid, and extends to an outer surface that is in contact with the ambient environment may create a source of process fluid leaks. In order to remedy process fluid leaks, a field technician or other skilled worker may be required to diagnose and repair the problem. Providing a process pressure transmitter manifold that is less susceptible to leaks would benefit the process measurement and control industry.

SUMMARY

A process fluid pressure measurement system includes a process fluid pressure transmitter coupled to a coplanar manifold. The coplanar manifold includes a first bore coupleable to a source of process fluid, and a vent passageway connected to the first bore and terminating in a vent hole. The manifold includes at least one port configured to receive a valve stem. Directly engaging the valve stem with the coplanar manifold selectively vents the manifold. Aspects of the present invention also include a coplanar manifold for coupling fluid to a process fluid pressure transmitter, and a method of venting such a coplanar manifold.

DETAILED DESCRIPTION

Figure 1:
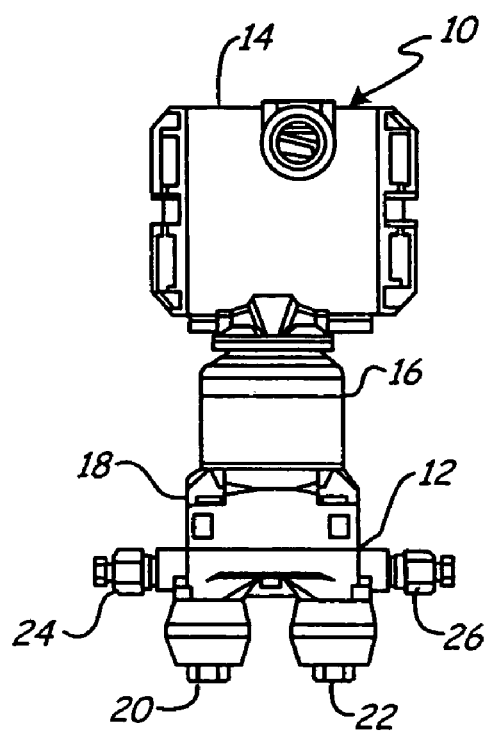
FIG. 1 is a diagrammatic view of a process fluid pressure transmitter coupled to a coplanar manifold in accordance with the prior art.

FIG. 1 is a diagrammatic view of a process fluid pressure transmitter 10 coupled to coplanar manifold 12 in accordance with the prior art. Process fluid pressure transmitter 10 generally includes an electronics compartment 14 coupled to a sensor compartment 16, which sensor compartment 16 is further coupled to an isolator assembly 18 that is finally coupled to coplanar manifold 12. Manifold 12 generally includes a pair of process fluid inlets 20, 22. FIG. 1 illustrates manifold 12 having a plurality of vent assemblies 24, 26. Each of assemblies 24, 26 generally threads into an internally threaded bore within manifold 12. Such internally threaded bores are typically specified as ¼ NPT.

Figure 2:
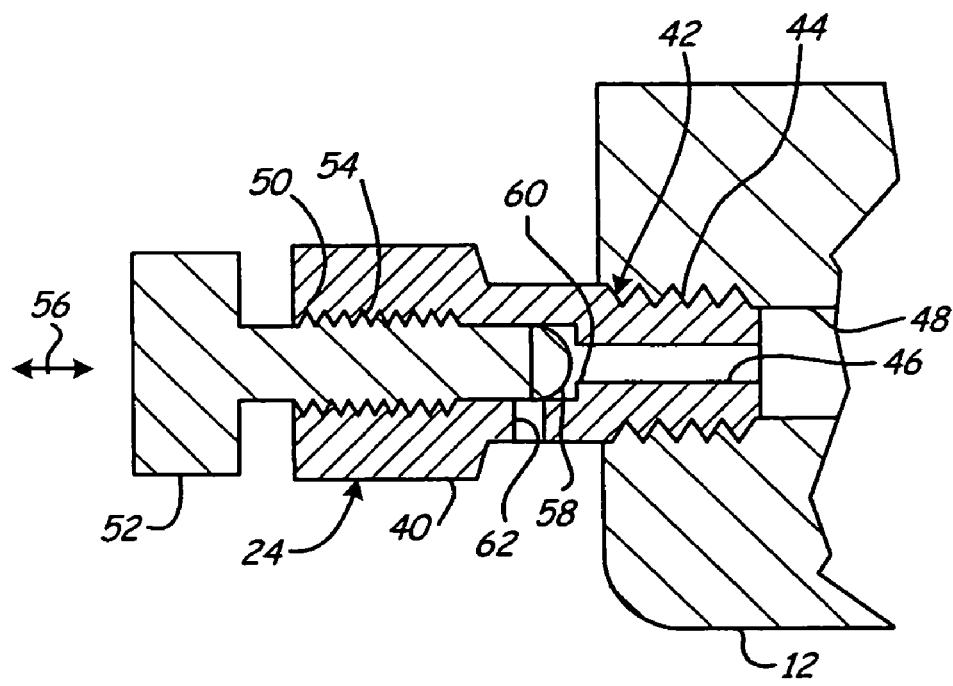
FIG. 2 is a cross sectional view of a valve stem/seat assembly engaged with a coplanar manifold in accordance with the prior art.

FIG. 2 is a cross sectional view of vent assembly 24 threaded into coplanar manifold 12. As illustrated, vent assembly 24 includes valve seat 40 that includes externally threaded region 42, which region 42 is adapted to engage internally threaded portion 44 of coplanar manifold 12. Region 42 of valve seat 40 includes an internal bore 46 in fluid communication with internal bore 48 of coplanar manifold 12. Valve seat 40 also includes an internally threaded region 50 that is adapted to receive valve stem 52. Valve stem 52 includes external thread 54 that is configured to engage internal thread 50 of valve seat 40. Accordingly, rotation of valve stem 52 within valve seat 40 translates valve stem 52 axially in the direction of arrow 56. Valve stem 52 includes seal 58 disposed on a distal end of stem 52. Accordingly, as valve stem 52 is suitably rotated within valve seat 40, seal 58 is brought into contact with edge 60 of internal bore 46. As valve stem 52 is rotated in an opposite direction, seal 58 moves away from edge 60 and allows internal bore 46 to fluidly communicate with vent hole 62.

The prior art valve stem/seal assembly described above with respect to FIG. 2 is somewhat limited. Specifically, the threaded joint between valve seat 40 and coplanar flange 12 provides a leak potential whereby process fluid could escape. Further, valve seat 40, itself, adds to the cost of the entire assembly. Further still, since valve seat 40 is threaded into flange 12, the orientation of vent hole 62 is randomly located relative to the transmitter assembly. This is undesirable because the actual location of the vented process fluid cannot be specified, or otherwise determined, with certainty.

Figure 3:
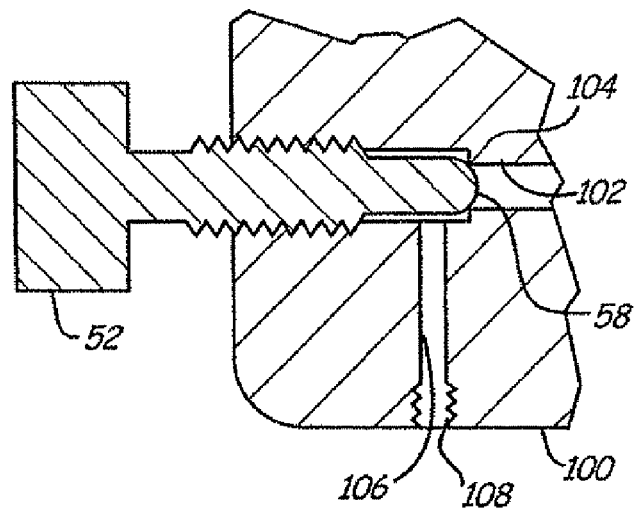
FIG. 3 is a cross sectional view of a valve seat engaged with a coplanar manifold in accordance with an embodiment of the present invention.

Embodiments of the present invention generally facilitate venting a coplanar process fluid pressure manifold using a valve stem coupled directly to the coplanar manifold. FIG. 3 is a cross sectional view of valve stem 52 coupled to coplanar manifold 100 in accordance with an embodiment of the present invention. Coplanar manifold 100 includes an internal bore 102 that is fluidically coupled to the process fluid. Bore 102 is fluidically coupled to vent passageway 106, which ultimately leads to vent hole 108. The portion of passageway 106 proximate vent hole 108 may include internal threads in order to allow a threaded plug therein, in case a user wishes to use a different form of venting, or no venting at all. Corner 104 is preferably shaped to engage seal 58 of stem 52. As illustrated in FIG. 3, bore 102 and vent passageway 106 are generally arranged at right angles relative to each other with corner 104 interposed therebetween. However, this is merely one arrangement which is configured to facilitate allowing seal 58 to selectively block fluidic communication between bore 102 and vent passageway 106. Additionally, since vent passageway 106 is machined, or otherwise created, directly into manifold 100, the location and/or orientation of vent hole 108 relative to manifold 100 is completely determined. Various configurations of vent passageway 106 and internal passageway 102 can be implemented in accordance with various embodiments of the present invention. For example, vent passageway 106 and internal bore 102 need not be at right angles with respect to each other, and rotation of valve stem 52 need not translate valve stem 52 axially along the center line of internal bore 102.

Figure 4:
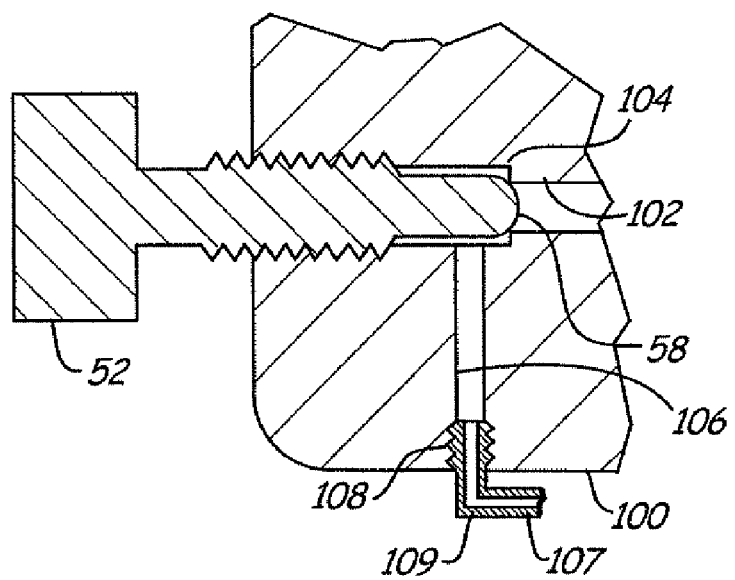
FIG. 4 is a diagrammatic view of a valve seat engaged with a coplanar manifold in accordance with another embodiment of the present invention.

FIG. 4 is a diagrammatic view of a valve seat engaged with a coplanar manifold in accordance with another embodiment of the present invention. FIG. 4 bears many similarities to FIG. 3, and like components are numbered similarly. The main difference between the embodiments illustrated in FIGS. 3 and 4, is that in FIG. 4, vent hole 108 has directional adapter 109 engaged therein. Adapter 109 is configured to engage internal threads of vent hole 108 to be affixed thereto. Adapter 109 includes a passageway that fluidly couples to vent passageway 106 and changes the direction of fluid exiting vent hole 108 from the axis of vent passageway 106. In the embodiment illustrated in FIG. 4, adapter 109 generates a substantially right angle turn in the vented fluids, however, other configurations can also be practiced in accordance with embodiments of the present invention. Adapter 109 is also somewhat rotatable within vent hole 108 to allow the direction of venting to be configurable. Preferably, but not necessarily, adapter 109 includes a portion that extends in the new direction. For example, in FIG. 4, adapter 109 includes portion 107 extending in a direction that is substantially perpendicular to the axis of vent passageway 108. However, it is also contemplated that adapter 109 could merely include a vent hole directing vent fluid in a different direction than that of the axis of vent passageway 106.

Figure 5:
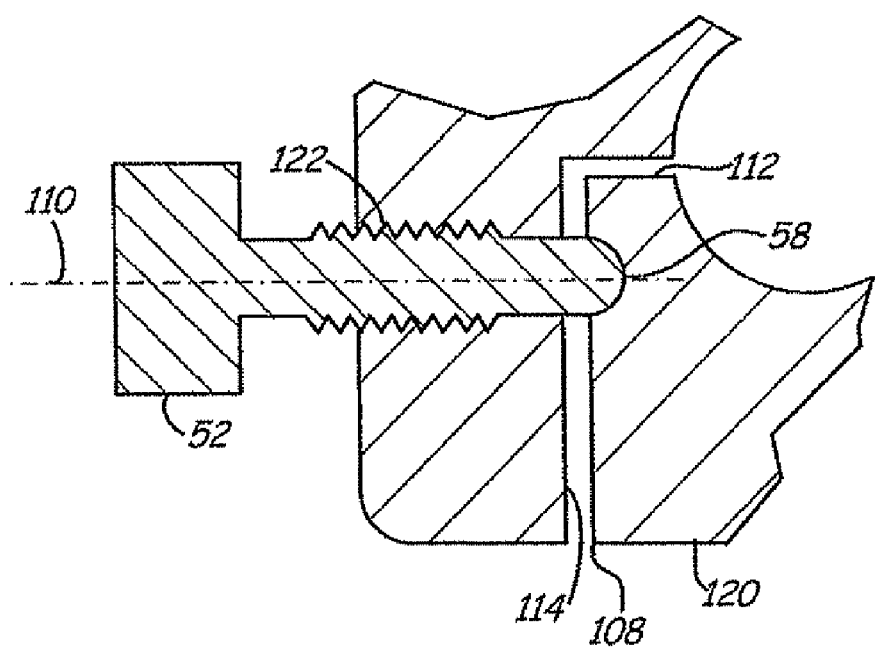
FIG. 5 is a diagrammatic view of a valve seat engaged with a coplanar manifold in accordance with yet another embodiment of the present invention.

FIG. 5 is a diagrammatic view of valve stem 52 being arranged such that rotation of valve stem 52 about axis 110 generates movement of stem 52 along axis 110, which axial movement generally drives seal 58 between passageway 112 and vent passageway 114.

Coplanar manifold 120 includes valve stem receiving portion 122 that is configured to receive valve stem 52 in such a way that valve stem 52 directly obstructs fluidic communication between internal passageway 112 and vent passageway 114. Valve stem 52 can be any suitable size, including that configured to directly engage an internal port of coplanar manifold 120 having straight (non-tapered) internal threads.

Figure 6:
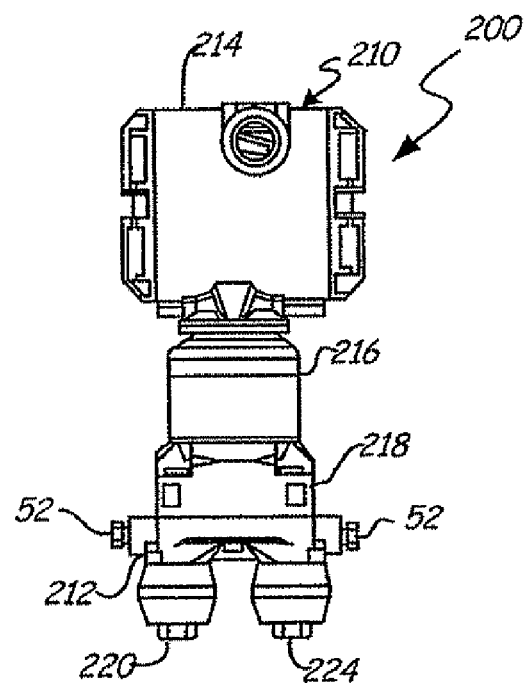
FIG. 6 is a diagrammatic view of a process fluid pressure measurement system in accordance with an embodiment of the present invention.

FIG. 6 is a diagrammatic view of a process fluid pressure measurement system 200 in accordance with an embodiment of the present invention. System 200 includes process fluid pressure transmitter 210, which generally includes electronics compartment 214 coupled to sensor compartment 216, which sensor compartment 216 is further coupled to isolator assembly 218 that is finally coupled to coplanar manifold 212. Process fluid inlets 220, 224 couple to a source of process fluid, and convey the process fluid into coplanar manifold 212. Coplanar manifold 212 is configured to directly receive valve stems 52, for purposes of selectively venting process fluid. Coplanar manifold 212 is coupled to isolator assembly 218 of process fluid pressure transmitter 210.

Isolator assembly 218 responds to process fluid pressure by generating a similar pressure within an isolation fluid, such as silicone oil, that is presented to a pressure sensor within sensor compartment 216. The pressure sensor can include any suitable transducing element that changes, such as deflects, in response to isolation fluid pressure. The transducer preferably includes an element that has an electrical property that changes with deflection. For example, the pressure sensor may include a conductive sensing diaphragm that has a capacitance that changes with deflection.

The pressure sensor is coupled to suitable electronics within electronics compartment 214. The electronics are configured to measure the changing electrical characteristic of the pressure sensor, to arrive at a pressure calculation. Moreover, the electronics preferably include controller electronics to transmit, or otherwise convey, digital information indicative of the pressure over a process communication loop, such as a Highway Addressable Remote Transducer (HART) loop or a FOUNDATION™ Fieldbus loop.

Figure 7:
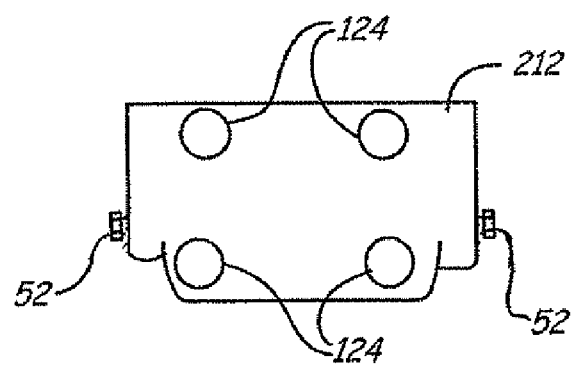
FIG. 7 is a bottom plan view of plurality of valve seats directly engaged with a coplanar manifold in accordance with an embodiment of present invention.

FIG. 7 is a bottom plan view of coplanar manifold 212 in accordance with an embodiment of the present invention. Coplanar manifold 212 includes a plurality of mounting holes 124 to allow manifold 212 to be mounted. As illustrated in FIG. 6, valve stem 52 engages directly with manifold 212 thereby obviating the necessity of a valve seat. The absence of the valve seat provides a number of advantages for embodiments of the present invention. Specifically, the cost of manufacturing a valve seat itself is eliminated. Moreover, any potential leak source of process fluid between a valve seat/manifold interface is also removed. Finally, since the vent passageway and vent hole are machined directly into the manifold, the location where the vented process fluid escapes is completely determined.

Figure 8:
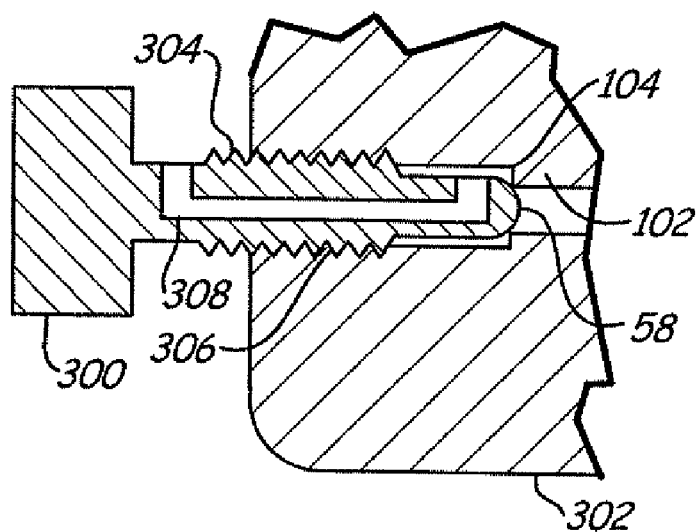
FIG. 8 is a diagrammatic view of a valve seat engaged with a coplanar manifold in accordance with an embodiment of the present invention.

FIG. 8 is a diagrammatic view of a valve seat engaged with a coplanar manifold in accordance with an embodiment of the present invention. Valve stem 300 engages directly with coplanar manifold 302. Preferably, such direct engagement is via external threads 304 cooperating with non-tapered internal threads 306 of coplanar manifold 302. Valve stem 300 includes seal 58 disposed at the distal end of valve stem 300. Seal 58 is configured to bear against corner 104 of coplanar manifold 302 to selectively interrupt fluid communication between passageway 102 of manifold 302 and vent passageway 308 disposed within valve stem 300. Providing a valve stem with a vent passageway disposed therein allows for a simpler design within coplanar manifold 302. However, like embodiments described above, valve stem 300 still directly engages manifold 302. While valve stem 300 is illustrated as being substantially one piece, it is contemplated that certain portions, such as seal 58, may be constructed of different materials than the rest of valve stem 300.

Although the present invention has been described with reference to preferred embodiments, workers skilled in the art will recognize that changes may be made in form and detail without departing from the spirit and scope of the invention.

What is claimed is:

1. A process fluid pressure measurement system comprising:
    a process fluid pressure transmitter;
    a coplanar manifold coupled to the process fluid pressure transmitter, the coplanar manifold including:
        a first passageway coupleable to a source of process fluid,
        a vent passageway connected to the first passageway and terminating in an internally threaded vent hole,
        a port configured to receive a valve stem in at least two positions, a first orientation blocking fluidic communication between the first passageway and the vent passageway, and a second position allowing fluidic communication therebetween; and
    a valve stem threaded into the port of the coplanar manifold; and
    a directional adapter threaded into the internally threaded vent hole.

2. The process fluid pressure measurement system of claim 1, wherein the valve stem includes a seal end that is configured to engage a corner to block process fluid communication between the first passageway and the vent passageway.

3. The process fluid pressure measurement system of claim 1, wherein the valve stem includes an externally threaded region that is configured to be received by an internally threaded region of the coplanar manifold.

4. The process fluid pressure measurement system of claim 3, wherein the internally threaded region of the coplanar manifold has non-tapered threads.

5. A coplanar manifold configured to couple a process fluid to a process fluid pressure transmitter, the manifold comprising:
    a first passageway coupleable to a source of process fluid;
    a vent passageway connected with the first passageway and terminating in an internally threaded vent hole;
    a port configured to receive a valve stem in at least two positions, a first orientation blocking fluidic communication between the first passageway and the vent passageway, and a second position allowing fluidic communication therebetween;
    a valve stem engaged with the port; and
    a directional adapter threaded into the internally threaded vent hole.

6. The coplanar manifold of claim 5, wherein the valve stem includes a seal end that is configured to engage a corner to block process fluid communication between the first passageway and the vent passageway.

* * * * *